(12) United States Patent
Nania

(10) Patent No.: US 11,643,018 B2
(45) Date of Patent: May 9, 2023

(54) TAILGATE ASSEMBLY HAVING A MOVABLE STEP

(71) Applicant: Ford Global Technologies, LLC, Dearborn, MI (US)

(72) Inventor: Adrian Nania, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 254 days.

(21) Appl. No.: 17/313,259

(22) Filed: May 6, 2021

(65) Prior Publication Data

US 2022/0355737 A1    Nov. 10, 2022

(51) Int. Cl.
  *B60R 3/02*  (2006.01)
  *B62D 33/027*  (2006.01)

(52) U.S. Cl.
  CPC ............ *B60R 3/02* (2013.01); *B62D 33/0273* (2013.01)

(58) Field of Classification Search
  CPC ........ B60R 3/02; B60R 3/007; B62D 33/0273
  See application file for complete search history.

(56) References Cited

U.S. PATENT DOCUMENTS

| | | | | |
|---|---|---|---|---|
| 4,191,388 A * | 3/1980 | Barksdale | ................. | B60R 3/02 280/166 |
| 4,639,032 A * | 1/1987 | Barbour | .................... | B60R 3/02 296/62 |
| 5,028,063 A * | 7/1991 | Andrews | ................... | B60R 3/02 280/166 |
| 5,549,312 A * | 8/1996 | Garvert | ..................... | B60R 3/02 280/166 |
| 5,732,996 A * | 3/1998 | Graffy | ....................... | B60R 3/02 280/166 |
| 5,853,116 A * | 12/1998 | Schreiner | ................. | B60R 9/00 224/404 |
| 6,364,392 B1 * | 4/2002 | Meinke | ..................... | B60P 3/40 296/57.1 |
| 6,422,342 B1 * | 7/2002 | Armstrong | ................ | E06C 5/02 182/127 |
| 6,454,338 B1 * | 9/2002 | Glickman | ............... | B60P 1/435 296/26.11 |
| 6,918,624 B2 * | 7/2005 | Miller | ................... | B62D 33/037 182/127 |
| 7,090,276 B1 * | 8/2006 | Bruford | ............. | B62D 33/0273 296/26.1 |
| 7,234,749 B1 * | 6/2007 | Firzlaff | ............. | B62D 33/0273 296/57.1 |
| 7,234,750 B1 * | 6/2007 | Doolittle | .................... | B60R 3/02 296/57.1 |

(Continued)

*Primary Examiner* — Jeffrey J Restifo
(74) *Attorney, Agent, or Firm* — Vichit Chea; Carlson, Gaskey & Olds, P.C.

(57) ABSTRACT

An assembly for a vehicle according to an exemplary aspect of the present disclosure includes, among other things, a step assembly that is movable back-and-forth between a first configuration and a second configuration. In the first configuration, the step assembly is adjustable between a tailgate deployed position and a tailgate stowed position while the step assembly is removably coupled to a tailgate of a vehicle. In the second configuration, the step assembly is adjustable between a vehicle deployed position and a vehicle stowed position while the step assembly is removably coupled to an area of the vehicle other than the tailgate.

20 Claims, 3 Drawing Sheets

(56) References Cited

U.S. PATENT DOCUMENTS

| | | | | |
|---|---|---|---|---|
| 7,261,357 B1 * | 8/2007 | Bechen | B60R 3/02 | |
| | | | 296/57.1 | |
| 7,441,820 B1 * | 10/2008 | Alvarado | B60R 3/007 | |
| | | | 182/127 | |
| 7,530,619 B1 * | 5/2009 | Bruford | B62D 33/0273 | |
| | | | 296/26.1 | |
| 7,896,419 B2 * | 3/2011 | Elliott | B60R 3/007 | |
| | | | 280/166 | |
| 8,348,325 B2 * | 1/2013 | Hausler | B62D 33/0273 | |
| | | | 296/62 | |
| 8,827,294 B1 * | 9/2014 | Leitner | B60R 3/02 | |
| | | | 280/166 | |
| 8,919,853 B2 * | 12/2014 | Krishnan | B60R 3/02 | |
| | | | 296/62 | |
| 9,302,719 B1 * | 4/2016 | Krishnan | B60R 3/02 | |
| 9,701,249 B2 * | 7/2017 | Leitner | B60R 3/02 | |
| 9,902,325 B1 * | 2/2018 | Patton | E06C 5/02 | |
| 9,944,231 B2 * | 4/2018 | Leitner | B60R 3/02 | |
| 9,988,103 B1 * | 6/2018 | Mouch | B62D 33/0273 | |
| 10,005,396 B2 * | 6/2018 | Spahn | B60R 3/02 | |
| 10,081,303 B1 * | 9/2018 | Ngo | B60R 3/00 | |
| 10,106,087 B2 * | 10/2018 | Stojkovic | B60R 3/02 | |
| 10,124,837 B2 * | 11/2018 | Reiners | B62D 33/03 | |
| 10,131,384 B2 * | 11/2018 | Raines | B60P 3/40 | |
| 10,173,595 B1 * | 1/2019 | Ulrich | B60R 3/02 | |
| 10,464,618 B2 * | 11/2019 | Loew | B60R 3/02 | |
| 10,543,789 B1 * | 1/2020 | Hemphill | B62D 33/037 | |
| 10,927,581 B2 * | 2/2021 | Nania | E05F 15/614 | |
| 10,994,660 B2 * | 5/2021 | Ngo | B62D 33/0273 | |
| 11,351,921 B2 * | 6/2022 | Ortiz | B60R 3/02 | |
| 11,358,529 B2 * | 6/2022 | Reimer | B60R 3/02 | |
| 11,535,161 B1 * | 12/2022 | Walker | B60R 3/02 | |
| 2002/0070577 A1 * | 6/2002 | Pool, III | B60R 3/02 | |
| | | | 296/62 | |
| 2009/0072571 A1 * | 3/2009 | Elliott | B62D 33/0273 | |
| | | | 296/62 | |
| 2017/0274940 A1 * | 9/2017 | Povinelli | B60R 3/02 | |
| 2018/0043831 A1 * | 2/2018 | Stojkovic | B60P 3/14 | |
| 2018/0065560 A1 * | 3/2018 | Krishnan | B60R 3/02 | |
| 2018/0072242 A1 * | 3/2018 | Spahn | B25H 1/16 | |
| 2019/0389388 A1 * | 12/2019 | Ngo | B60R 3/02 | |
| 2020/0070898 A1 * | 3/2020 | Salvia, III | B62D 33/037 | |
| 2020/0109588 A1 * | 4/2020 | Nania | E05F 15/40 | |
| 2021/0039722 A1 * | 2/2021 | Williamson | B62D 33/0273 | |
| 2021/0086702 A1 * | 3/2021 | Christensen | B60R 3/02 | |
| 2021/0163082 A1 * | 6/2021 | Borkar | B60R 3/02 | |
| 2022/0161869 A1 * | 5/2022 | Nania | B62D 33/0273 | |
| 2022/0161870 A1 * | 5/2022 | Horner | B60R 3/02 | |
| 2022/0297607 A1 * | 9/2022 | Bornschlegel | B60R 3/007 | |
| 2022/0355737 A1 * | 11/2022 | Nania | B60R 3/02 | |
| 2023/0008195 A1 * | 1/2023 | Salter | B62D 33/037 | |

* cited by examiner

US 11,643,018 B2

TAILGATE ASSEMBLY HAVING A MOVABLE STEP

TECHNICAL FIELD

This disclosure relates generally to a step assembly for a vehicle and, more particularly, to a step assembly that can be moved back-and-forth between a configuration where the step assembly is coupled to a tailgate of the vehicle and another configuration.

BACKGROUND

Vehicles, such as pickup trucks, include a cargo bed. A tailgate assembly can enclose one end of the cargo bed when the tailgate assembly is in the closed position. The tailgate assembly can pivot to the open position where the tailgate assembly is substantially horizontal and aligned with a floor of the cargo bed.

SUMMARY

An assembly for a vehicle according to an exemplary aspect of the present disclosure includes, among other things, a step assembly that is movable back-and-forth between a first configuration and a second configuration. In the first configuration, the step assembly is adjustable between a tailgate deployed position and a tailgate stowed position while the step assembly is removably coupled to a tailgate of a vehicle. In the second configuration, the step assembly is adjustable between a vehicle deployed position and a vehicle stowed position while the step assembly is removably coupled to an area of the vehicle other than the tailgate.

In another exemplary embodiment of the foregoing assembly, the tailgate is pivotable back-and-forth between an open position and a closed position. The step assembly provides a stepping surface facing vertically upward when the step assembly is in the tailgate deployed position and when the tailgate is in the open position.

Another example of any of the foregoing assemblies includes the tailgate pivotably coupled to a cargo bed of the vehicle. The tailgate has a trailer clearance opening.

In another example of any of the foregoing assemblies, the step assembly closes the trailer clearance opening when the step assembly is in the tailgate stowed position.

In another example of any of the foregoing assemblies, the trailer clearance opening opens vertically upward when the tailgate is in the closed position.

Another example of any of the foregoing assemblies includes a trailer neck coupled to a cargo bed floor of the vehicle. The trailer neck is disposed at least partially within the trailer clearance opening when the step assembly is in the second configuration.

In another example of any of the foregoing assemblies, the step assembly is at least partially retracted within the tailgate when the step assembly is in the tailgate stowed position.

In another example of any of the foregoing assemblies, the area of the vehicle is a side wall of a cargo bed.

Another example of any of the foregoing assemblies includes a side wall of the vehicle and a lid. The lid is configured to cover a chamber of the vehicle when the step assembly is in the first configuration. When the step assembly is in the second configuration, at least a portion of the step assembly is held within the chamber.

In another example of any of the foregoing assemblies, when the step assembly is in the second configuration and the step assembly is in the vehicle stowed position, the step assembly is contained within the chamber and the lid can cover the chamber.

In another example of any of the foregoing assemblies, the lid is a lockable lid.

In another example of any of the foregoing assemblies, the chamber opens to a laterally facing side of the vehicle. The chamber is disposed along a longitudinal axis of the vehicle between a cab and a rear wheel of the vehicle.

A vehicle assembly according to another exemplary aspect of the present disclosure includes, among other things, a tailgate that is pivotable back-and-forth between an open position and a closed position. The tailgate has a trailer clearance opening formed in a central region of the tailgate. The trailer clearance opening opens vertically upward when the tailgate is in the closed position.

The assembly further includes a side wall of a cargo bed and a step assembly that is movable back-and-forth between a first configuration and a second configuration. In the first configuration, the step assembly is adjustable between a tailgate deployed position and a tailgate stowed position while the step assembly is removably coupled to a tailgate of the vehicle. The step assembly closes the trailer clearance opening when the step assembly is in the tailgate stowed position. The step assembly provides a stepping surface facing vertically upward when the step assembly is in the tailgate deployed position and when the tailgate is in the open position. In the second configuration, the step assembly is adjustable between a vehicle deployed position and a vehicle stowed position while the step assembly is removably coupled to a side wall of the cargo bed.

A method of providing access to a cargo bed of a vehicle according to yet another exemplary aspect of the present disclosure includes, among other things, providing a step assembly in a first configuration where the step assembly is removably coupled to a tailgate of the vehicle and is adjustable between a tailgate deployed position and a tailgate stowed position. The method further includes moving the step assembly from the first configuration to a second configuration. In the second configuration, the step assembly is removably coupled to an area of the vehicle other than the tailgate and is adjustable between a vehicle deployed position and a vehicle stowed position.

In another example of the foregoing method, the tailgate includes a trailer clearance opening. The step assembly closes the trailer clearance opening when the step assembly is coupled to the tailgate and is in the tailgate stowed position.

In another example of any of the foregoing methods, the step assembly provides a stepping surface facing vertically upward when the step assembly is in the tailgate deployed position and when the tailgate is in the open position.

Another example of any of the foregoing methods includes using a lid to cover the step assembly within a chamber of the vehicle when the step assembly is in the vehicle stowed position.

In another example of any of the foregoing methods, the area of the vehicle is a side wall of a cargo bed.

In another example of any of the foregoing methods, the area of the vehicle is between the cab of the vehicle and the rear wheel of the vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to a step assembly movable back-and-forth between a first configuration where the step assembly is pivotably coupled to a tailgate of a vehicle and a second configuration where the step assembly is pivotably coupled to another area of the vehicle.

Figure 1:
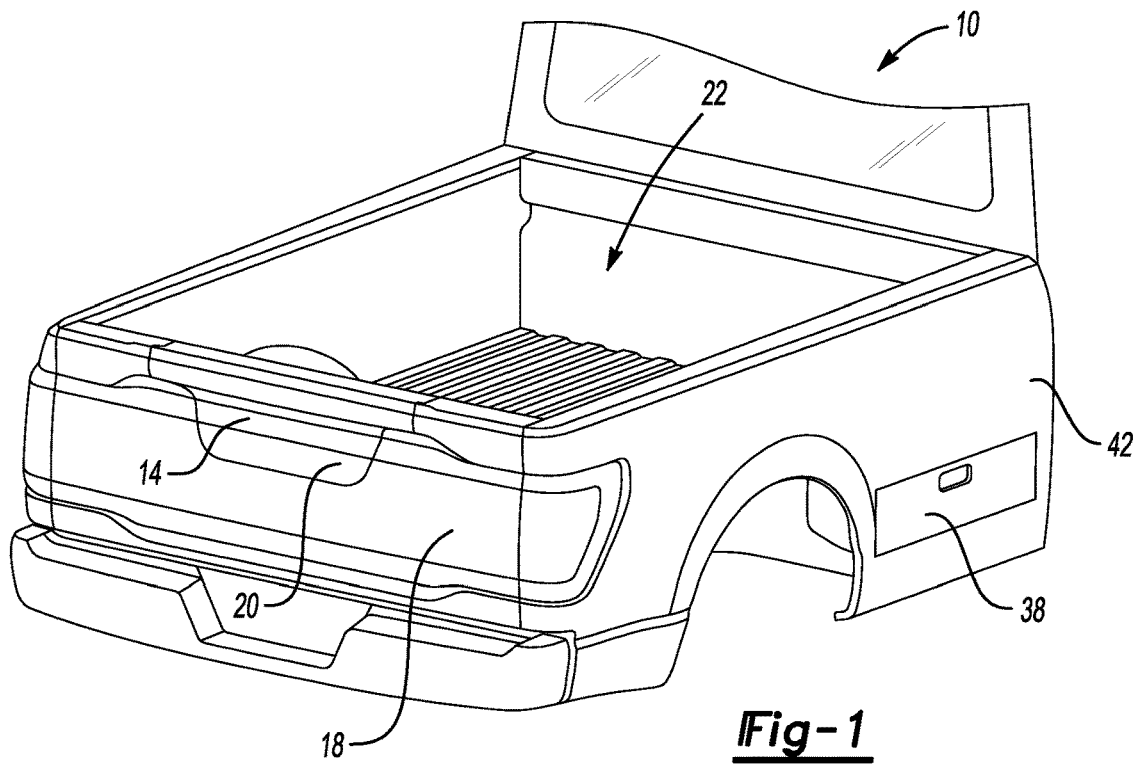
FIG. 1 illustrates a rear view of a vehicle having a step assembly pivotably coupled to a tailgate in a first configuration when the step assembly is in a tailgate stowed position.
Figure 2:
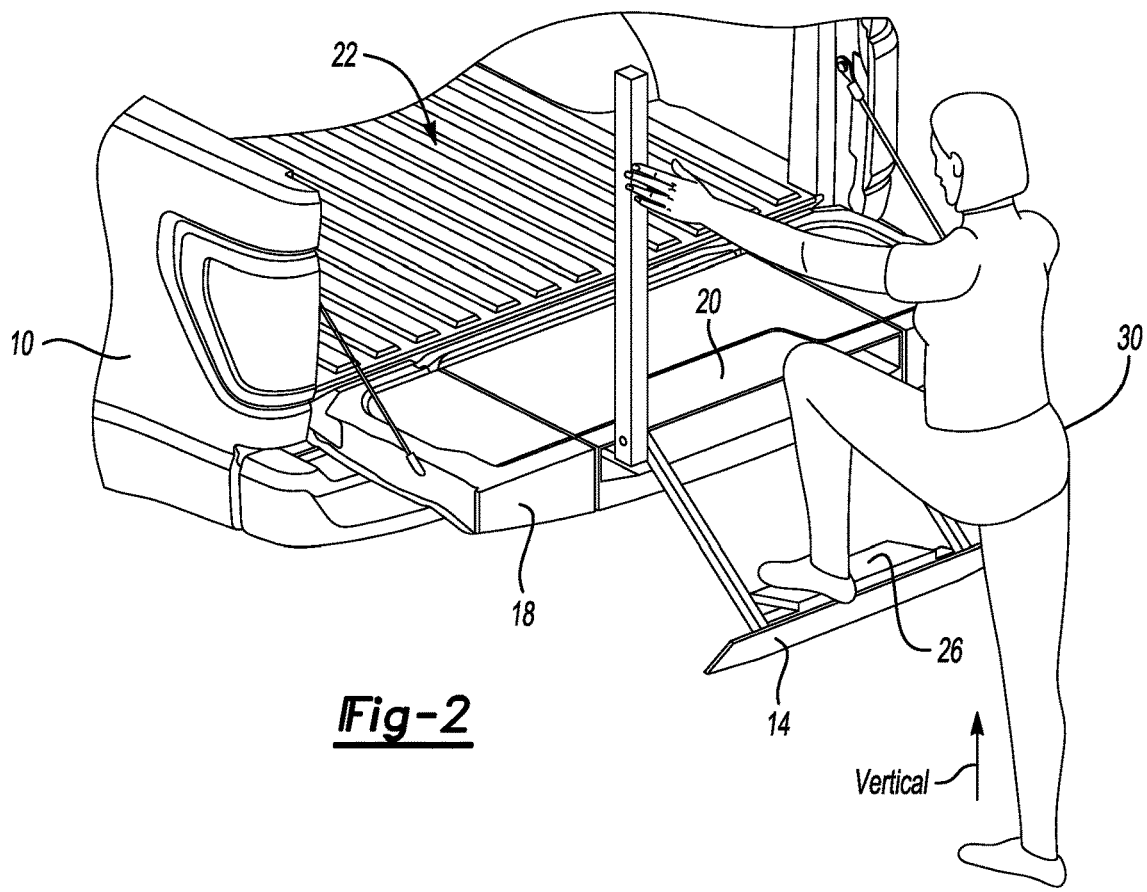
FIG. 2 illustrates the rear view of FIG. 1 when the tailgate is open and the step assembly is moved to a tailgate deployed position.

With reference to FIGS. 1 and 2, a vehicle 10 includes a step assembly 14 in a first configuration where the step assembly 14 is pivotably coupled to a tailgate 18. The tailgate 18 is at an aft end of a cargo bed 22 of the vehicle 10. The tailgate 18 is pivotably coupled to the cargo bed 22 and is pivotable back-and-forth between a closed position an open position. In FIG. 1, the step assembly 14 is in a tailgate stowed position and the tailgate 18 is in the closed position. In FIG. 2, the step assembly 14 is in a tailgate deployed position and the tailgate 18 is in the open position. The step assembly 14 is adjustable back-and-forth between the tailgate deployed position shown in FIG. 2 and the tailgate stowed position shown in FIG. 1 while the step assembly 14 is coupled to the tailgate 18 of the vehicle.

The step assembly 14 includes a body portion 20 and a stepping surface 26. When the tailgate 18 is in the open position and the step assembly 14 is in the tailgate deployed position, the stepping surface 26 is withdrawn away from the body portion 20 and the stepping surface 26 faces vertically upward. A user 30 can step on the stepping surface 26 to assist with entering or exiting the cargo bed 22. Vertical, for purposes of this disclosure, is with reference to ground and a general orientation of the vehicle 10 during operation.

Figure 3:
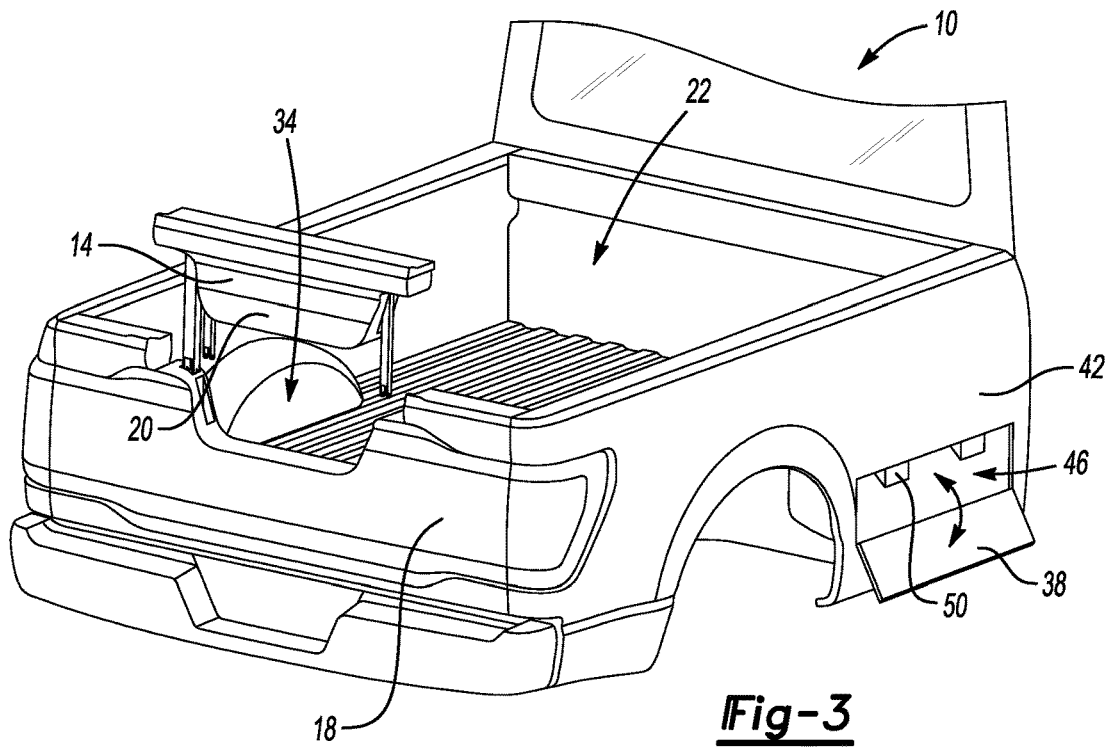
FIG. 3 illustrates the rear view of FIG. 1 when the step assembly is uncoupled from the tailgate and when a lid in a side wall of the vehicle is open.

With reference now to FIG. 3 and continued reference to FIGS. 1 and 2, the step assembly 14 is removably coupled to the tailgate 18. Uncoupling the step assembly 14 from the tailgate 18 reveals a trailer clearance opening 34 within the tailgate 18. The trailer clearance opening 34 opens vertically upward when the tailgate 18 is in the closed position. When the step assembly 14 is in the tailgate stowed position, the step assembly 14 is received within and closes the trailer clearance opening 34.

The step assembly 14 provides exterior surfaces of the vehicle 10. When the tailgate 18 is closed and the step assembly 14 is retracted within the tailgate 18 in the tailgate stowed position, the body portion 20 of the step assembly 14 provides an exterior A-surface that faces rearward and other exterior surfaces that face forward and provide part of the cargo bed 22.

After uncoupling the step assembly 14 from the tailgate 18, the step assembly 14 can be moved to a second configuration where the step assembly 14 is removably coupled to an area of the vehicle 10 other than the tailgate 18.

In this example, a lid 38 is hingedly connected to a side wall 42 of the cargo bed 22. The lid 38 is flipped open as shown in FIG. 3 to reveal a chamber 46. When the lid 38 is flipped closed, the lid 38 covers the chamber 46. The lid 38 can be lockable when the lid 38 is in the closed position. The chamber 46 is between a cab of the vehicle 10 and a rear wheel of the vehicle 10 in this example. In other examples, the chamber 46 could be disposed in another area of the vehicle 10, such as within a frunk or door of the vehicle 10.

The step assembly 14, after being removed from the tailgate 18, can be removably coupled to the two connectors 50 within the chamber 46, which removably couples the step assembly 14 to an area of the vehicle 10 other than the tailgate 18. Flip clamps or toggle clamps could be used as connectors 50 for example.

After coupling the step assembly 14 to the connectors 50, the user 30 withdraw the stepping surface 26 outside the chamber 46 and away from the body portion 20. The user can then step on the stepping surface 26 as shown in FIG. 4 to assist the user 30 accessing the cargo bed 22 from a position extending over the side wall 42.

Figure 4:
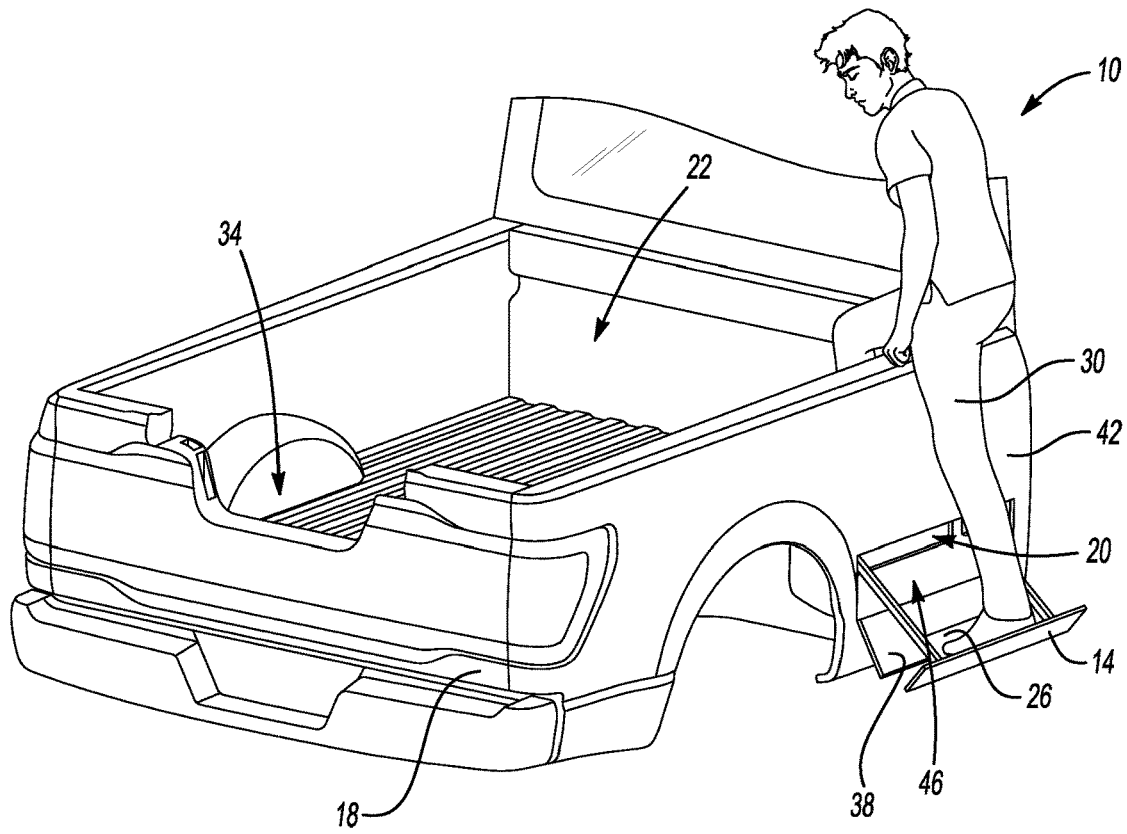
FIG. 4 illustrates the rear view of FIG. 1 when the step assembly is pivotably coupled to an area of the vehicle other than the tailgate such that the step assembly is in a second configuration and is in a vehicle deployed position.

When the step assembly 14 is removably coupled to the connectors 50, the stepping surface 26 can be moved from the vehicle deployed position shown in FIG. 4 to a vehicle stowed position where the step assembly 14 is received entirely within the chamber 46 such that the lid 38 can flip back to the closed position of FIG. 1.

Figure 5:
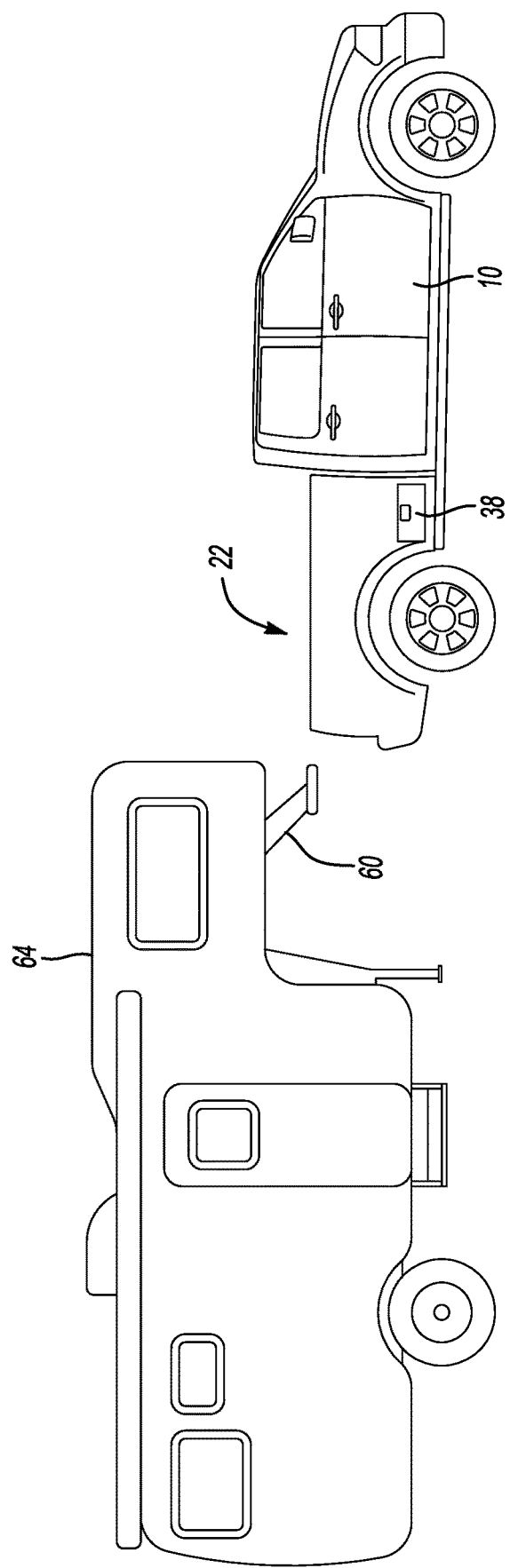
FIG. 5 illustrates a side view of a trailer and the vehicle of FIG. 1 when the step assembly is in the second configuration and is in a vehicle stowed position a trailer.

When the step assembly 14 is in the vehicle stowed position, the trailer clearance opening 34 is open and not closed by the step assembly 14. The vehicle 10, as shown in FIG. 5, can then move into a position where the vehicle 10 is ready to be coupled to a trailer neck 60 of the trailer 64.

In this example, the trailer neck 60 is a gooseneck hinge that couples to a floor of the cargo bed 22 when towed by the vehicle 10. The trailer clearance opening 34 provides clearance for the trailer neck 60 when the trailer neck 60 is coupled to the vehicle 10. The trailer neck 60 can be at least partially disposed within the trailer clearance opening 34 when the trailer neck 60 is coupled to the floor of the cargo bed 22. Because of the trailer clearance opening 34, the tailgate 18 may not need to be opened to provide clearance for the trailer neck 60.

Features of the disclosed examples include a tailgate step that can be removed from the tailgate and stored in an area of a vehicle that is not typically utilized for storage. The area can be a chamber that is covered by a lid. The lid on the storage box for the step can be locked and secured from theft. The chamber can be utilized for other items when the step is not within the chamber.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An assembly for a vehicle, comprising:
a step assembly that is movable back-and-forth between a first configuration and a second configuration,
in the first configuration, the step assembly is adjustable between a tailgate deployed position and a tailgate stowed position while the step assembly is removably coupled to a tailgate of a vehicle and,
in the second configuration, the step assembly is adjustable between a vehicle deployed position and a vehicle stowed position while the step assembly is removably coupled to an area of the vehicle other than the tailgate.

2. The assembly of claim 1, wherein the tailgate is pivotable back-and-forth between an open position and a closed position, wherein the step assembly provides a stepping surface facing vertically upward when the step assembly is in the tailgate deployed position and when the tailgate is in the open position.

3. The assembly of claim 1, further comprising the tailgate pivotably coupled to a cargo bed of the vehicle, the tailgate having a trailer clearance opening.

4. The assembly of claim 3, wherein the step assembly closes the trailer clearance opening when the step assembly is in the tailgate stowed position.

5. That assembly of claim 3, wherein the trailer clearance opening opens vertically upward when the tailgate is in the closed position.

6. The assembly of claim 3, further comprising a trailer neck coupled to a cargo bed floor of the vehicle, the trailer neck disposed at least partially within the trailer clearance opening when the step assembly is in the second configuration.

7. The assembly of claim 1, wherein the step assembly is at least partially retracted within the tailgate when the step assembly is in the tailgate stowed position.

8. The assembly of claim 1, wherein the area of the vehicle is a side wall of a cargo bed.

9. The assembly of claim 1, further comprising a side wall of the vehicle and a lid, the lid configured to cover a chamber of the vehicle when the step assembly is in the first configuration, when the step assembly is in the second configuration, at least a portion of the step assembly is held within the chamber.

10. The assembly of claim 9, wherein, when the step assembly is in the second configuration and the step assembly is in the vehicle stowed position, the step assembly is contained within the chamber and the lid can cover the chamber.

11. The assembly of claim 9, wherein the lid is a lockable lid.

12. The assembly of claim 9, wherein the chamber opens to a laterally facing side of the vehicle, the chamber is disposed along a longitudinal axis of the vehicle between a cab and a rear wheel of the vehicle.

13. The assembly of claim 1, further comprising a lid that is configured to cover a chamber of the vehicle when the step assembly is in the first configuration, wherein, when the step assembly is in the second configuration, at least a portion of the step assembly is held within the chamber.

14. A vehicle assembly, comprising:
a tailgate that is pivotable back-and-forth between an open position and a closed position, the tailgate having a trailer clearance opening formed in a central region of the tailgate, the trailer clearance opening that opens vertically upward when the tailgate is in the closed position;
a side wall of a cargo bed; and
a step assembly that is movable back-and-forth between a first configuration and a second configuration,
in the first configuration, the step assembly is adjustable between a tailgate deployed position and a tailgate stowed position while the step assembly is removably coupled to the tailgate of a vehicle, the step assembly closing the trailer clearance opening when the step assembly is in the tailgate stowed position, the step assembly providing a stepping surface facing vertically upward when the step assembly is in the tailgate deployed position and when the tailgate is in the open position,
in the second configuration, the step assembly is adjustable between a vehicle deployed position and a vehicle stowed position while the step assembly is removably coupled to the side wall of the cargo bed.

15. A method of providing access to a cargo bed of a vehicle, the method comprising:
providing a step assembly in a first configuration where the step assembly is removably coupled to a tailgate of a vehicle and is adjustable between a tailgate deployed position and a tailgate stowed position; and
moving the step assembly from the first configuration to a second configuration, in the second configuration, the step assembly is removably coupled to an area of the vehicle other than the tailgate and is adjustable between a vehicle deployed position and a vehicle stowed position.

16. The method of claim 15, wherein the tailgate includes a trailer clearance opening, the step assembly closing the trailer clearance opening when the step assembly is coupled to the tailgate and in the tailgate stowed position.

17. The method of claim 15, wherein the step assembly provides a stepping surface facing vertically upward when the step assembly is in the tailgate deployed position and when the tailgate is in the open position.

18. The method of claim 15, further comprising using a lid to cover the step assembly within a chamber of the vehicle when the step assembly is in the vehicle stowed position.

19. The method of claim 15, wherein the area of the vehicle is a side wall of a cargo bed.

20. The method of claim 15, wherein the area of the vehicle is between a cab of the vehicle and a rear wheel of the vehicle.

* * * * *